United States Patent
Donovan (10) Patent No.: US 10,409,263 B2
(45) Date of Patent: Sep. 10, 2019

(54) DIFFUSING AN ERROR IN THREE-DIMENSIONAL CONTONE MODEL DATA

(71) Applicant: HEWLETT-PACKARD DEVELOPMENT COMPANY, L.P., Houston, TX (US)

(72) Inventor: David H. Donovan, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 172 days.

(21) Appl. No.: 15/512,488

(22) PCT Filed: Oct. 8, 2014

(86) PCT No.: PCT/US2014/059704
§ 371 (c)(1),
(2) Date: Mar. 17, 2017

(87) PCT Pub. No.: WO2016/057031
PCT Pub. Date: Apr. 14, 2016

(65) Prior Publication Data
US 2017/0252979 A1 Sep. 7, 2017

(51) Int. Cl.
| | | |
|---|---|---|
| *B29C 67/00* | (2017.01) | |
| *B33Y 50/02* | (2015.01) | |
| *G05B 19/4099* | (2006.01) | |
| *H04N 1/405* | (2006.01) | |
| *B29C 64/386* | (2017.01) | |

(52) U.S. Cl.
CPC ........ *G05B 19/4099* (2013.01); *B29C 64/386* (2017.08); *B33Y 50/02* (2014.12); *H04N 1/405* (2013.01); *H04N 1/4052* (2013.01); *G05B 2219/49023* (2013.01)

(58) Field of Classification Search
None
See application file for complete search history.

(56) References Cited

U.S. PATENT DOCUMENTS

| | | |
|---|---|---|
| 5,534,104 A | 7/1996 | Langer et al. |
| 6,506,477 B1 | 1/2003 | Ueda et al. |

(Continued)

FOREIGN PATENT DOCUMENTS

| | | |
|---|---|---|
| EP | 0516325 | 12/1992 |
| WO | WO2013113372 | 8/2013 |

OTHER PUBLICATIONS

Brackett et al. "An error diffusion based method to generate functionally graded cellular structures", Computers and Structures vol. 138 (Jul. 1, 2014) pp. 102-111 (Year: 2014).*

(Continued)

*Primary Examiner* — Yingchun He
(74) *Attorney, Agent, or Firm* — HP Inc. Patent Department (57) ABSTRACT

A method of diffusing an error in three-dimensional contone model data includes generating halftone data for a slice among a number of slices of the three-dimensional contone model data, generating compensatory error values based on the generated halftone data, and adding the generated compensatory error values to contone data for a successive slice.

18 Claims, 5 Drawing Sheets

(56) References Cited

U.S. PATENT DOCUMENTS

| | | | |
|---|---|---|---|
| 2002/0122210 A1* | 9/2002 | Mitchell Ilbery | H04N 1/4052 358/3.04 |
| 2003/0103241 A1* | 6/2003 | Sharma | H04N 1/52 358/3.06 |
| 2004/0080078 A1 | 4/2004 | Collins | |
| 2005/0053798 A1 | 3/2005 | Maekawa et al. | |
| 2007/0081738 A1 | 4/2007 | Mantell | |
| 2011/0249298 A1 | 10/2011 | Gullentops et al. | |
| 2013/0189028 A1* | 7/2013 | Gershenfeld | F16B 3/00 403/345 |
| 2013/0295212 A1 | 11/2013 | Chen | |

OTHER PUBLICATIONS

Chi Zhou et al., 'Three-dimensional digital halftoning for layered manufacturing based on droplets', Transactions of NAMRI/SME, vol. 37, 2009 pp. 175-182.

Holmes, A.S. et al; "Excimer Laser Micromachining With Half-Tone Masks for the Fabrication of 3-D Microstructures"; Mar. 2004; http://www3.imperial.ac.uk/pls/portallive/docs/1/3035905.PDF.

Y.E. Siu; "Modeling the Material Grading and Structures of Heterogeneous Objects for Layered Manufacturing"; Computer-Aided Design; vol. 34, Issue 10, Sep. 1, 2002; pp. 705-716.

Wonjoon Cho et al; "A Dithering Algorithm for Local Composition Control with Three-Dimensional Printing"; Computer-Aided Design; vol. 35, Issue 9; Aug. 2003; pp. 851-867.

\* cited by examiner

DIFFUSING AN ERROR IN THREE-DIMENSIONAL CONTONE MODEL DATA

BACKGROUND

Additive manufacturing systems allow for the formation of three dimensional object from a build material and electronic data defining a three-dimensional model of the object.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

In additive manufacturing, the three-dimensional object being fabricated is represented by an electronic three-dimensional model. Prior to fabrication, the data is logically divided into a number of slices, each of which may correspond to a physical layer of the object. However, in some cases, multiple slices will relate to a single physical layer. This is referred to as overslicing to allow for better handling of features which occur at slice boundaries. Then, each layer of the object is formed in a stack to eventually complete the object.

A number of types of additive manufacturing processes exist that allow a user, with the three-dimensional model data, to generate the object. These include thermal processes such as selective laser sintering (SLS), chemical processes such as stereolithography (SLA), and other material coalescing processes. Some of these processes may involve the migration of heat or reactive chemical species laterally and, in some cases, between adjacent object layers. Indeed, if heat is generated at one point in the object, that heat may affect the amount of heat experienced by other portions of the object. Similarly, as reactive chemical species diffuse into surrounding areas, they may affect chemical reactions occurring in those areas. This may result in reduced dimensional accuracy or other flaws in the object due to the material curing, melting, coalescing, or reacting in undesired locations and in undesired ways due to the migration of energy or reactants.

Halftoning is a technique used in two-dimensional printing to reproduce a continuous tone image on a printer capable of printing only a small number of tone levels. Halftoning involves placing a number of dots on a media, varying the position, shape, size, and/or color of the dots so as to blend the dots such that the human eye cannot detect the individual dots from a sufficient distance, but instead sees an image that closely resembles the original contone (i.e., continuous tone) image. With additive manufacturing systems, the same concept may apply. In three dimensions, halftoning is a technique that transforms a model of an object having areas of continuous density into a binary representation of that continuous or contone data so that the modeled object can be rendered by a variety of additive manufacturing techniques. The difference between traditional two-dimensional halftoning of a printed image and three-dimensional halftoning is that halftone data for printing dictates binary dot patterns on the surface of a print medium, while three-dimensional halftoning provides particle patterns arranged in space. Thus, the halftone data becomes a map or pattern that tells the additive manufacturing system where build material should be solidified to form a current layer of the object. Thus, in practice in different additive manufacturing systems, the halftone data will indicate where a coalescing or other chemical agent should be deposited in a powdered build material, where a build material should be deposited in a system that only places build material where it is needed or points where energy such as a laser should be applied to solidify build material. However, the dots in two-dimensional printing correspond to actions taken to form a physical layer of the object, for example, a point of deposition of a build material, application of energy to build material, deposition of chemical reactant into a build material, and others.

The present specification describes a method of diffusing an error in three-dimensional contone model data by generating halftone data for a slice among a number of slices of the three-dimensional contone model data, generating compensatory error values based on the generated halftone data, and adding the generated compensatory error values to contone data for a successive slice.

The present specification also describes an additive manufacturing system that includes a processor, an error diffusion module, and a halftoning module. The processor, with the halftoning module, generates halftone data for a slice among a number of slices of three-dimensional contone model data. The error diffusion module generates compensatory error values based on the generated halftone data and adds the generated compensatory error values to contone data for a successive slice.

The present specification also describes a method that includes generating halftone data for a slice among a number of slices of a three-dimensional contone model, which generates halftone error values, generating compensatory error values based on the generated halftone data, adding a portion of the halftoning error values to the compensatory error values to get augmented error values, and adding the augmented error values to contone data for a successive slice.

In the present specification and in the appended claims, the term "additive manufacturing device" means any device that fabricates a three-dimensional object from a build material using slices of model data to form corresponding layers of the object.

In the present specification and in the appended claims, the term "build material" means a loose or fluid material, for example, a powder, from which a desired three-dimensional object is formed in additive manufacturing.

As used in the present specification and in the appended claims, the term "slice" means a sub-set of model data for a planar cross-section of a three-dimensional object represented electronically by a three-dimensional model from which the "slice" is taken.

As used in the present specification and in the appended claims, the term "layer" means a planar cross-section of a physical, three-dimensional object. In additive manufacturing, a layer of the three-dimensional object corresponds to at least one slice of the three-dimensional model data.

As used in the present specification and in the appended claims, the term "coalesce" means to solidify or fuse into a solid mass a build material that was formerly loose or fluid.

As used in the present specification and in the appended claims, the term "coalescing agent" means any substance that causes a build material to coalesce. In some cases, the coalescing agent is activated by the application of energy, such as radiation.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Figure 1:
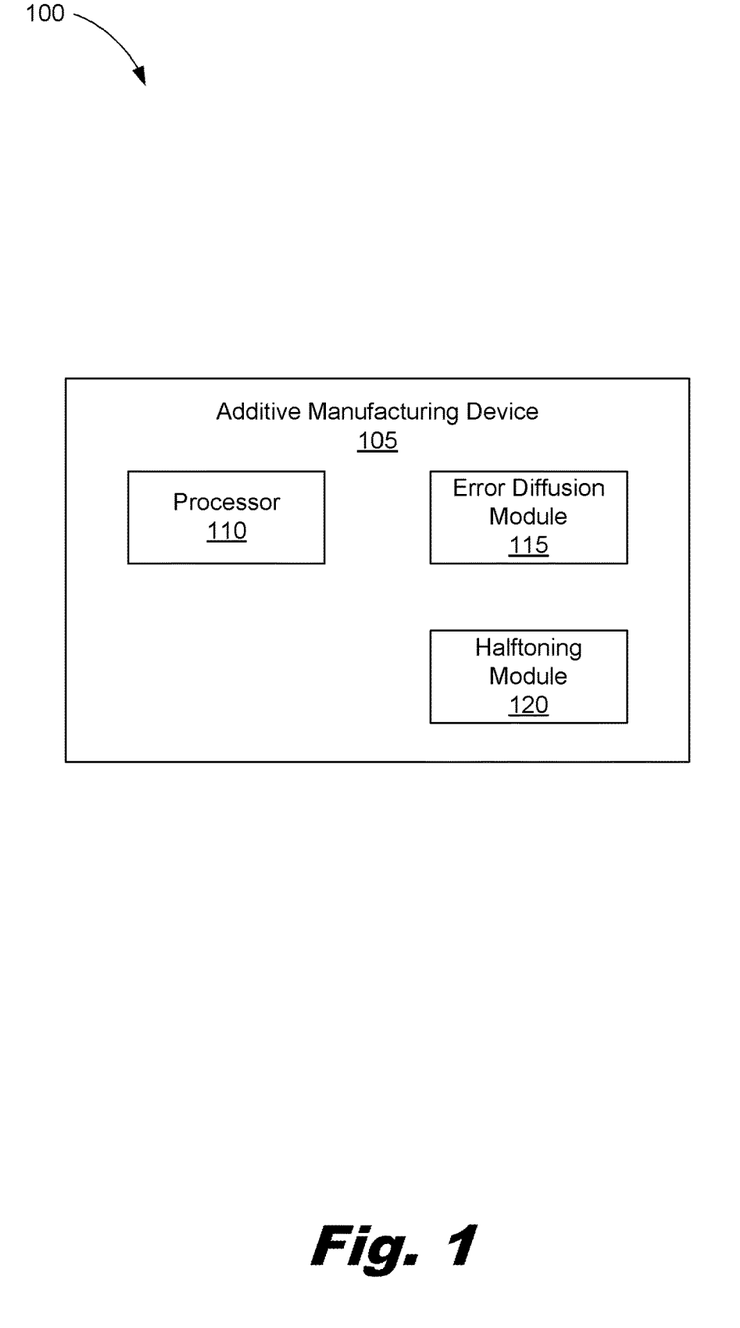
FIG. 1 is a block diagram of an additive manufacturing system according to one example of the principles described herein.

Turning to FIG. 1, a block diagram of an additive manufacturing system (100) according to one example of the principles described herein is shown. The additive manufacturing system (100) may comprise an additive manufacturing device (105), a processor (110), an error diffusion module (115), and a halftoning module (120). The device (105) receives three-dimensional model data describing a three-dimensional object to be fabricated.

The data is logically divided into a number of slices of data each representing a horizontal layer of the three-dimensional object. Each slice of data may comprise a number of pixels or voxels represented by a value. If we are considering a slice two-dimensionally, we speak of pixels. If we are considering the slice as representing a three-dimensional layer of an object, we speak of voxels.

As explained above, contone data values are subjected to a halftoning process in which each value in each voxel of the contone data is compared to a threshold halftone matrix that provides, for each voxel, a threshold value. If the contone value for a specific voxel in the slice exceeds the threshold value for a voxel in the halftone matrix at the same x and y location, an amount of energy, build material, or fluid is to be deposited at that location during the fabrication of the three-dimensional object. In contrast, where a contone value for a specific voxel does not exceed the threshold value for a voxel at the same x and y location, no energy, build material, or fluid is to be deposited at the corresponding location. Additionally, as will be described below, before the halftoning of a successive slice occurs, a compensatory error value may be added to the contone data describing the successive slice. In one example, the compensatory error value is a negative error value. This compensatory error value may be used to compensate for any heat or chemical bleeding that may occur during the fabrication of the three-dimensional object. As will be described below, along with the halftone matrix being generated for the slice, a compensatory error value matrix is also generated comprising these compensatory error values.

The halftone data can then be used by the additive manufacturing device (105) to produce the desired object. As noted, there are a number of different types of additive manufacturing. For example, the device (105) may deposit a binder or coalescing agent into a layer of powered build material to form a layer of the object. In other examples, voxels of build material are deposited in a build area onto a stage or substrate via an extruder to form a layer of the object. In other examples, a build material may be selectively subjected to a laser source causing the build material to sinter. In still other examples, a resin curable with electromagnetic radiation may be irradiated so as to harden into a layer of the object being fabricated. In each of these examples, the processor (110) may cause the material to be deposited or the build material to be coalesced according to the halftone data generated via the method described herein.

The processor (110) may include the hardware architecture to retrieve executable code from the data storage device (110) and execute the executable code. The executable code may, when executed by the processor (110), cause the processor (110) to implement at least the functionality of generating halftone data for a slice among a number of slices of the three-dimensional contone model data, generating compensatory error values based on the generated halftone data, adding the generated compensatory error values to contone data for a successive slice, and generating halftone data for the successive slice.

The device (105) further comprises a number of modules used in the implementation of the corrective error diffusion described herein among a number of slices of three-dimensional model data. The various modules within the device (105) may comprise hardwired logic, such as an Application Specific Integrated Circuit (ASIC), executable program code, or some combination of hardware and software. In this example, the various modules may be stored as separate computer program products. In another example, the various modules within the device (105) may be combined within a number of computer program products; each computer program product comprising a number of the modules.

The error diffusion module (115) may, when executed by the processor (110), provide for the generation of compensatory error values based on the generation of halftone data for a given slice of three-dimensional model data. The error diffusion module (115) may then diffuse or add this compensatory error data, voxel by voxel, to the contone data of a successive slice of the three-dimensional model data. In one example, where ever a voxel in the halftone data having an x-y location indicates that that specific voxel is to have heat, build material, or fluid applied, a compensatory error value may be added to the contone data for the successive slice at the same x-y location in the contone data. The same x-y location in the successive slice may be referred to herein as a "corresponding voxel." In another example, the error diffusion module (115) may diffuse the compensatory error value to a corresponding voxel as well as those voxels neighboring the corresponding voxel.

The halftoning module (120) may, via the processor (110) generate halftone data for each slice of model data in the three-dimensional model. During halftoning, where the contone value for a specific voxel exceeds a threshold value for a corresponding voxel in a threshold matrix a halftoning error may also be produced equal to the amount that the contone value exceeded the threshold value. This error value represents fluid that was not able to be deposited in that voxel location. For matrix halftoning, this error is simply thrown away. With error diffusion halftoning, this error is divided up and added to adjacent contone voxels that have not yet been halftoned. Thus, in addition to the generation of the compensatory error value described above, the halftoning module, (120) also generates a halftoning error. As will be discussed below, the compensatory error value is passed to a successive slice of the three-dimensional model data. In one example, each compensatory error value for a given x-y voxel coordinate may incorporate a portion of a corresponding halftoning error generated from the halftoning processes but not all of the halftoning error. Thus, as used in the present specification and in the appended claims a "portion" of a corresponding halftoning error means some but not all of the halftoning error.

During operation, the device (105), via the processor (120), generates first halftone data for a first slice among a number of slices of the three dimensional object using the halftoning module (120). The processor (120) may then use the error diffusion module (115) to generate a compensatory error value for each voxel indicated by the halftone data as having heat, build material, or fluid deposited onto the three-dimensional object being generated. The compensatory error value may be any value that may, in one example, compensate for any propagation of heat or chemical reactant through the three-dimensional object as it is being generated.

The device (105), via the processor (110), may then combine, voxel by voxel, each of the compensatory error values with contone values for a successive slice of the three-dimensional model data. The processor (110) may then take the augmented contone values associated with the successive slice and, with the halftoning module (120), halftone the augmented contone data to get halftone data for the successive slice. The addition of the compensatory error values with the contone data of the successive slice results in a change in the halftone data among a number of successive slices of the three-dimensional model data. A change in halftone data in this error diffusion halftoning process described herein will produce a different dot pattern, which will help prevent flaws in dot patterning from occurring in the same locations in each slice of the three-dimensional object.

In one example, the halftoning module (120) may implement a non-error diffusion halftoner such as a matrix halftoner where any errors generated from the halftoning process are discarded. In this example, the start position of the halftone matrix may be moved to prevent any repetition of flaws that might occur due to a repetition of the same halftone data being used to build successive layers of the three-dimensional object.

Figure 2:
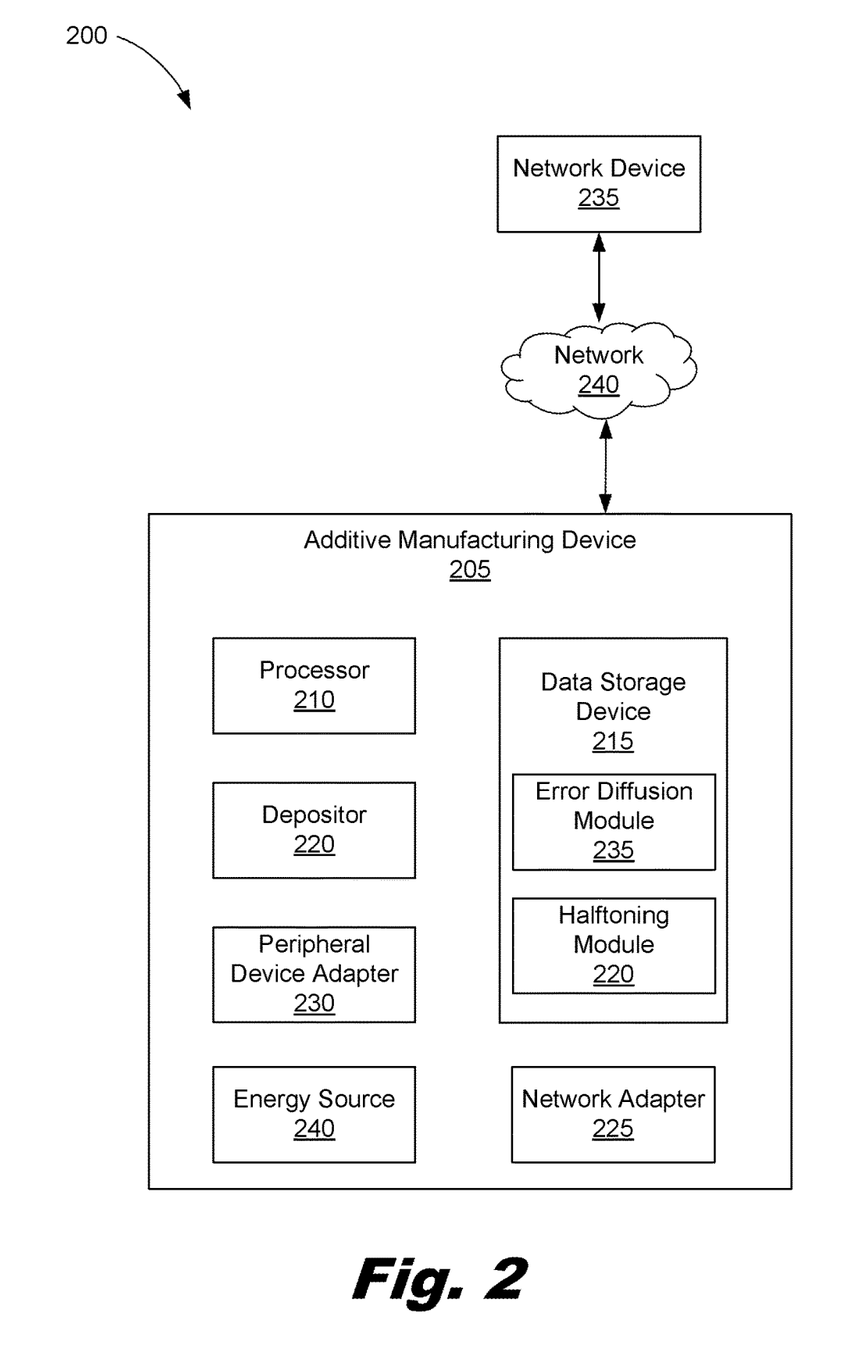
FIG. 2 is a block diagram of an additive manufacturing printing system according to one example of the principles described herein.

FIG. 2 is a block diagram of an additive manufacturing system (200) according to one example of the principles described herein. FIG. 2 comprises a processor (210), an error diffusion module (235), and a halftoning module (220) similar to those described above in connection with FIG. 1. The system (200) may further comprise an additive manufacturing device (205) and a network device (235).

In one example, the network device (235) may be communicatively coupled to the device (205) via a network (240). The network device (235), in one example, may be any computing device that provides three-dimensional model data to the device (205) in order to print a three-dimensional copy representing that model data. In one example, the network is an intranet, an internet, or the Internet. Once the data is received, the device (205), via the processor (210), executes the executable code described above and herein to cause the processor (110) to implement at least the functionality of generating halftone data for a slice among a number of slices of the three-dimensional contone model data, generating compensatory error values based on the generated halftone data, adding at least a portion of the generated compensatory error values to contone data for a successive slice, and generating halftone data for the successive slice.

The device (205) may also comprise a data storage device (215). The data storage device (215) in this system (200) may store data such as executable program code that is executed by the processor (210) or other processing device. The data storage device (215) may specifically store computer code representing a number of applications and modules (235) that the processor (210) executes to implement at least the functionality described herein. The data storage device (215) may also have similar characteristics as described above in connection with the data storage device (FIG. 1, 110) of the device (FIG. 1, 100).

The hardware adapters (225, 230) in the device (205) enable the processor (210) to interface with various other hardware elements, external and internal to the device (205). For example, the peripheral device adapters (230) may provide an interface to input/output devices, such as, for example, a display device, a mouse, or a keyboard. The peripheral device adapters (230) may also provide access to other external devices such as an external storage device, a number of network devices such as, for example, servers, switches, and routers, client devices, other types of computing devices, and combinations thereof. The network adapter (240) may provide an interface to other computing devices within, for example, the network (240) as mentioned above. This may enable the transmission of data between the device (205) and other devices located within the network.

The depositor (220) may be any device capable of depositing a fluid or solid onto a surface. In one example, the depositor (220) may be a piezoelectric printhead or a thermal inkjet printhead. In this example, the fluid deposited may be a coalescing agent with this coalescing agent being deposited onto a layer of build material, such as a powdered ceramic, metal, or plastic build material. The coalescing agent may therefore be deposited onto the build material as dots representing the halftoning data generated by the halftoning module (123) via the processor (210) as described herein. The coalescing agent may receive energy from an energy source (240) such as a microwave source, infrared source, or visible radiation source and transfer that energy in the form of heat into the medium causing the medium to heat up, melt, coalesce into a continuous mass, and then solidify as it is cooled. In one example, the energy from the energy source (240) may be applied to an entire layer of a three-dimensional object at the same time thereby causing the entire coalescing agent in the layer to receive the energy. In another example, the energy may be applied to multiple layers thereby causing all of the coalescing agent in the layers to receive the energy. In another example, the energy may be applied to a portion of a layer equaling less than the entirety of that layer thereby causing all of the coalescing agent in that portion of the layer to receive the energy. This, thereby, creates a layer of the three-dimensional object.

In other examples, the depositor (220) may be controlled to deposit, in accordance with received halftoning data, any type of fluid that may harden or cure thereby creating the three-dimensional object. In still another example, the depositor (220), according to received halftoning data, may deposit a number of different fluids that react with one another or with a build material and solidify thereby generating a portion of the three-dimensional object. In a further example, the depositor (220) may be controlled, according to received halftone data, to deposit a ultra-violet radiation curable material that will solidify upon application of UV radiation from the energy source (240). In still another example, the depositor (220) may be controlled, according to received halftone data, to deposit a binding material onto a building material that glues together particles of the build material. In one example, the building material may be a ceramic powder, a metal, a plastic, an inorganic material, or a composite material such as a fiber reinforced plastic, or a polymer infused ceramic.

The device (205) may use the depositor (220) as a scanning depositor or a page-wide array depositor. In a scanning depositor, the depositor (220) may be allowed to scan relative to the surface of a medium or surface onto which a fluid is ejected. In one example, the depositor (220) is allowed to move along an x- and y-axial plane. In this example, the depositor (220) may be controlled to scan in the x-axis. The depositor (220) may also be controlled to index in the y-axis after each scan until the entire surface of the print area has been covered. In another example, a support on which the three-dimensional object is being built may index in the y-axis after each scan until the entire surface of the print area has been covered. In a page-wide array depositor, multiple depositors (220) or sets of depositors (220) acting as a single depositor (220) cover, in at least one dimension, the print area. In this example, a single scan of the page-wide depositor may cover the entire print area thereby increasing the speed at which the three-dimensional object may be generated. In the case of a page-wide array, the surface onto which the fluid is deposited may move respective to the page-wide array. As such, the present specification contemplates the use of any type of depositor (220) being used to deposit a fluid in order to generate a three-dimensional object.

The energy source (240) may apply energy to a build material to coalesce, sinter, or melt the build material. Consequently, the energy source (240) may also apply energy to the build material to coalesce the build material according to received halftoning data.

Figure 3:
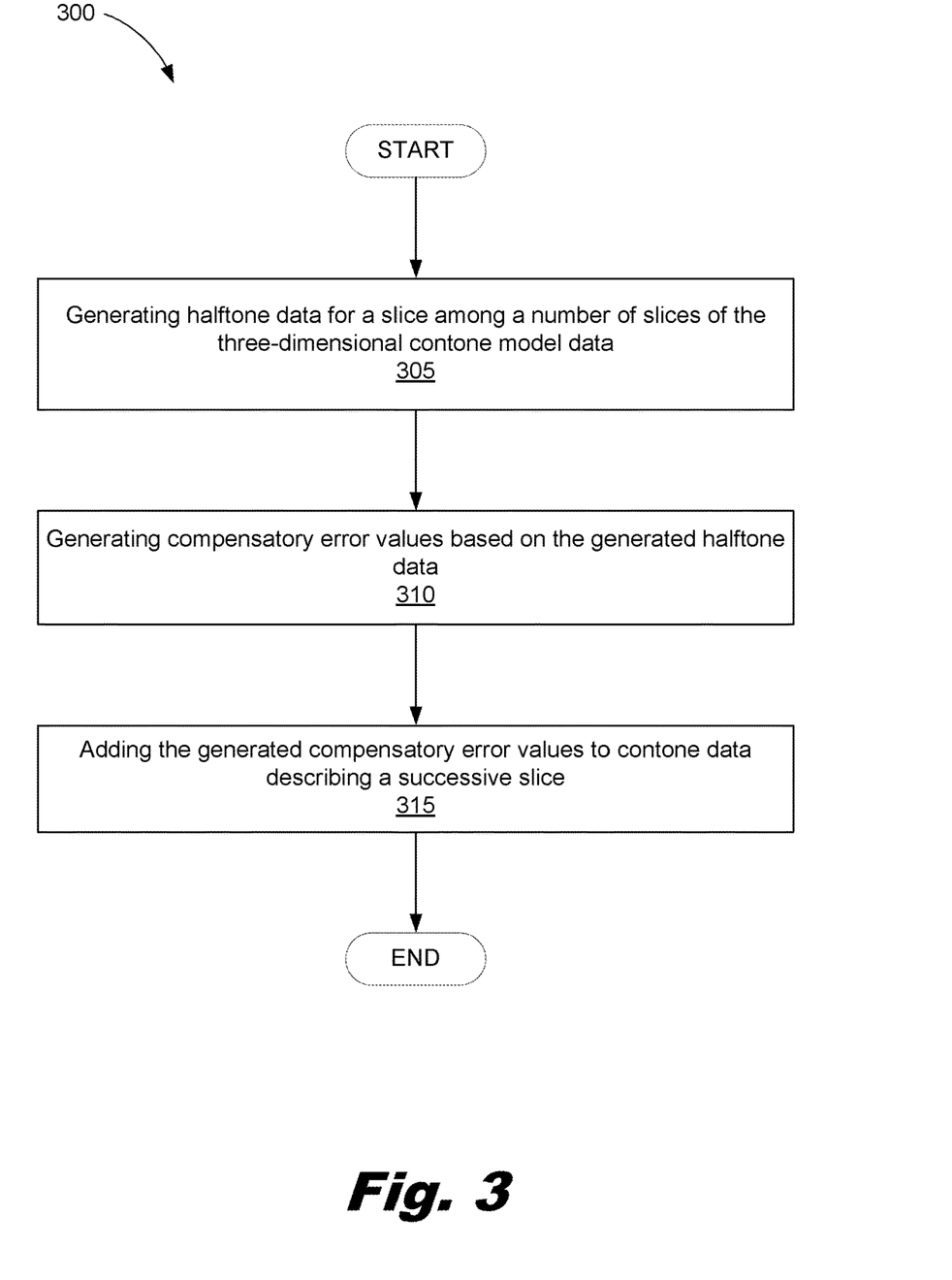
FIG. 3 is a flowchart showing a method of diffusing an error in three-dimensional model data according to one example of the principles described herein.

FIG. 3 is a flowchart showing a method (300) of diffusing an error in three-dimensional contone model data according to one example of the principles described herein. The method may begin with generating (305) halftone data for a slice among a number of slices of the three-dimensional contone model data. In one example, the halftone data is generated using an error diffusion halftoner via a process that implements, for example, a modified Floyd-Steinberg algorithm. Error diffusion halftoning comprises receiving contone data representing a number of pixels or voxels of a two-dimensional slice of three-dimensional model data, comparing the contone data values of each voxel to corresponding voxel threshold values to determine if a dot of fluid or build material, or energy from an energy source should be placed, subtracting the threshold value from the contone value if it exceeds the threshold, and diffusing this remainder value, often termed the "halftoning error," to neighboring voxels for each given voxel. The diffusion of the error value is accomplished by distributing and adding portions of the error to the contone value of neighboring voxels that have not yet been halftoned in the current slice of the three-dimensional model data.

The method may continue by generating (310) compensatory error values based on the generated halftone data. As described above, the compensatory error values are based on the generated halftone values in that a compensatory error is generated (310) where ever the halftone data indicates that energy, a build material, or a fluid is to be applied or deposited during the additive manufacturing process. In one example, the compensatory error value is a negative error value.

The method may then continue by adding (310) the generated compensatory error values to contone data of a successive slice in the three-dimensional model data. In one example, all of the error for a specific voxel is added to a corresponding voxel in the contone data for the successive slice. In another example, part of the error may be diffused or added into both a corresponding voxel location in a successive slice as well as each of the neighboring voxels of the corresponding voxel. In yet another example, at least part of the halftone error value described above may be combined with the compensatory error value and added (215) to a corresponding voxel in the contone data for the successive slice.

In several additive manufacturing processes, the contone and halftone data represents the energy or energy absorbing material to be applied to cause the object to solidify. In other additive manufacturing processes, the data may represent a quantity of a chemical catalyst or chemical reactant(s) which may combine with other chemical species to cause portions of the build material to solidify. As described above, the energy or chemical species used to coalesce the materials used to build the three-dimensional object may propagate in undesired ways into other portions of the object, causing additional solidification outside of the object dimensions. Although these effects may be mitigated through the addition of modifying agents that help prevent this propagation, errors may still occur. As such, this extra energy or reactivity may be represented by the compensatory error value during the error diffusion halftoning process.

The method (300) may also include generating halftone data for the successive slice. The generation of the halftone data for the successive slice may be done similar to that done for the preceding slices and may also comprise the generation of an error value. The process described may continue throughout all of the slices of the three-dimensional mode data by adding a compensatory error of a previous slice to the contone data of a successive slice until all slices have received a compensatory error and have been halftoned.

The method may also include proceeding with a printing procedure such that the layer of the three-dimensional object is generated. In one example, the data storage device (FIG. 2, 215) may store the contone data, halftone data, halftone error values, and compensatory error values for use by the processor (FIG. 1, 110; FIG. 2, 210), the error diffusion module (FIG. 1, 115; FIG. 2, 235), and the halftoning module (FIG. 1, 120; FIG. 2, 220). During printing of the individual layers of the three-dimensional object, the data storage device (FIG. 2, 215) may serve as a buffer such that a layer of the three-dimensional object may be printed while slices of the three-dimensional mode data are being processed as described in this method.

In one example, the compensatory error values may be passed through a decay function before being added to each successive layer. The decay function diminishes the effects of any given error over a given distance thereby decreasing the effects one slice's error values have on slices further away from the slice than the immediately successive slice. In an example where the effects are localized to just the next slice of the three-dimensional object, the error values generated in the previous slice can be written to an initially blank two-dimensional array rather than adding them to previous values and using the decay function.

In some examples of the above described halftoning process, when used with negative error values, a reduction in the quantities of dots in regions where a previous layer had relatively larger quantities of dots may occur. In one example where a coalescing agent and ceramic powder is used, a reduction in the concentration of a coalescing agent deposited on the build material can be seen in a second slice of the three-dimensional object. This is because higher concentrations of coalescing agents may absorb and emit additional heat to surrounding build material and the error diffusion halftoning process described herein may take into account this additional heat when determining how much coalescing agent to deposit on a second or subsequent slice.

Figure 4:
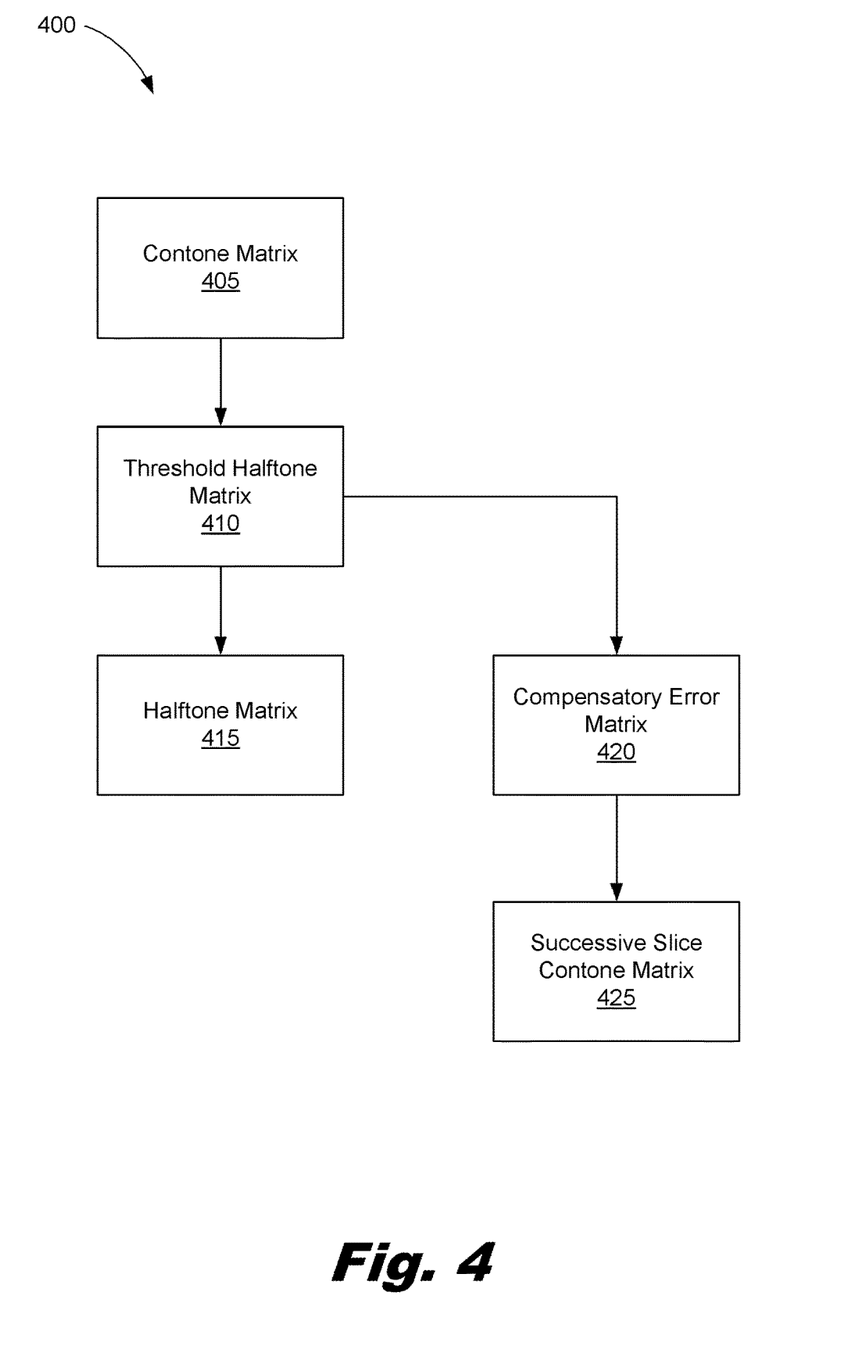
FIG. 4 is a block diagram showing a method of generating a compensatory error matrix according to one example of the principles described herein.

FIG. 4 is block diagram showing a method (400) of generating a compensatory error matrix according to one example of the principles described herein. During halftoning, the processor (110) of the additive manufacturing device (105) is presented with a contone matrix (405) describing the contone values for a slice of model data from the three-dimensional model. The processor (110) is also presented with a threshold matrix (410) to which the value in any given voxel of the contone matrix (405) is compared. The result of the comparison is called a halftone matrix (415). Specifically, the contone matrix (405) and threshold matrix (410) both have numerical values associated with each voxel in their respective matrix (405, 410). Where a value of a voxel in the contone matrix (405) exceeds a threshold value in a corresponding x,y voxel of the threshold matrix (410), an indication in a corresponding x,y voxel of the halftone matrix (415) is made indicating that energy, fluid or build material is to be placed in the voxel. The opposite is true as well. Specifically, where a value of a voxel in the contone matrix (405) does not exceed a threshold value in a corresponding x,y voxel of the threshold matrix (410), an indication in a corresponding x,y voxel of the halftone matrix (415) is made indicating that energy, fluid or build material is not to be placed in the voxel.

According to one example of the principles described herein, a compensatory error matrix (420) is also generated while the halftone matrix (415) is being generated. In this example, the values of each voxel in the threshold matrix (410) are subtracted from the values of each corresponding voxel in the contone matrix (405). For each calculation, either a negative or positive value will be presented. A negative value is presented when the contone value in the voxel exceeds the threshold value in the corresponding voxel. A positive value is presented when the contone value in the voxel does not exceed the threshold value in the corresponding voxel. The resulting values are placed in corresponding voxel locations in the compensatory error matrix (420).

As a result, the degree to which energy, a fluid, or a build material is to be placed in any given voxel for a first slice is mapped out in the compensatory error matrix (420). As will be described below, at least the negative values in the compensatory error matrix (420) are added to corresponding contone values for a successive slice (425). The process for the successive slice may proceed as described above except that the contone data for the successive slice (425) has now been augmented by the values in the compensatory error matrix (420).

The above description on how a compensatory error value is obtained is merely one example. The present specification contemplates the use of any algorithm to determine a compensatory error matrix with individual compensatory error values for each voxel of the slice. In one example, a Floyd-Steinberg dithering may be used to push or add any residual quantization error of a voxel onto a corresponding voxel value within a contone matrix of a successive slice (425).

In yet another example, the compensatory error values may be determined by empirically creating a physical three-dimensional object and measuring the amount of heat or propagation of fluid that occurs as the object is being built. The measurements may be used to determine the compensatory error values by determining how much thermal or fluid bleed is to be compensated for during a successive fabrication of the three-dimensional object. These values may be presented in a look-up table for reference.

Figure 5:
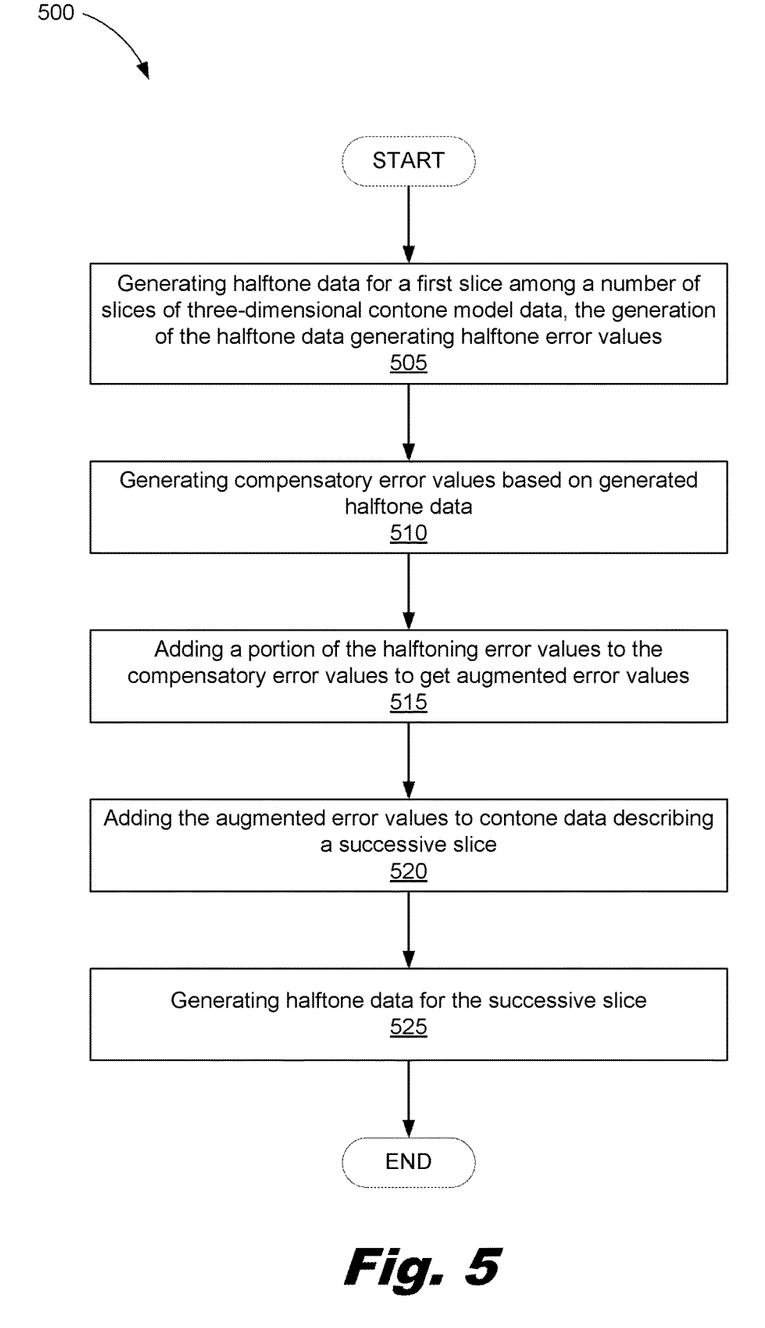
FIG. 5 is a flowchart showing a method of diffusing an error in three-dimensional model data according to another example of the principles described herein.

FIG. 5 is a flowchart showing a method of diffusing an error in three-dimensional contone model data according to another example of the principles described herein. The method (500) may begin with generating (505) halftone data for a slice among a number of slices of the three-dimensional contone model data wherein the generation of the halftone data further generates halftone error values. In one example, the halftone process may implement an error diffusion halftoner.

The method (500) may continue with generating (510) compensatory error values based on generated halftone data. The compensatory error values may be generated as described above by determining where the halftone data has indicated where energy, build material, or fluid is to be applied or deposited such that where this occurs. The compensatory error value may compensate for any energy or reactant bleed that may occur.

The method (500) may continue by adding (515) a portion of the halftoning error values to the compensatory error values to get an augmented error values. As described above a portion, but not all, of the halftoning error are added to the compensatory error values.

The method (500) may then continue by adding (520) the augmented error values to contone data for a successive slice and generating (525) halftoned data for the successive slice.

Aspects of the present systems (100, 200) and methods (300, 500) are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (FIG. 1, 110; FIG. 2, 210) of the device (100, 205) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

Specifically, the computer program product mentioned above may comprise a computer readable storage medium comprising computer usable program code embodied therewith, the computer usable program code comprising computer usable program code to, when executed by a processor (FIG. 1, 110; FIG. 2, 210), generate halftone data for a slice among a number of slices of the three-dimensional contone model data, generating compensatory error values based on the generated halftone data, adding the generated compensatory error values to contone data for a successive slice, and generating halftone data for the successive slice. The computer usable program code may comprise specific instructions that carry out the methods described above.

The specification and figures describe diffusing an error in three-dimensional contone model data. Halftone data may be generated for a number of slices of a three dimensional object and compensatory error values may be generated based on that halftone data such that, in one example, any halftone data of a successive slice of data represents different energy or density of build material or fluid in regions that are placed above regions where the previous halftone data defines such application or placement. The diffusion of an error in three-dimensional contone model data may have a number of advantages, including preventing errors inherent in generated halftone data from being repeated in the same locations throughout multiple layers of a three-dimensional object, thereby preventing the three-dimensional object from having visual or structural defects therein. Additionally, halftone patterning throughout the multiple slices of the object generates more consistent spacing between energy applications and deposition of build materials or fluids deposited to form the object that, in turn, improves the homogeneity of the object being built with the additive manufacturing system. Still further, the methods described herein adjusts the amount of curing or energy application regions of any given three-dimensional object may experience thereby preventing over curing or coalescing of the parts due to energy or chemical diffusion.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of diffusing an error in three-dimensional contone model data comprising:
   generating halftone data for a slice among a number of slices of the three-dimensional contone model data;
   generating compensatory error values based on the generated halftone data; and
   adding the generated compensatory error values to contone data for a successive slice;
   wherein the compensatory error values compensate for heat or fluid bleeding between adjacent layers of a three-dimensional object being formed from the contone model data.

2. The method of claim 1, wherein the compensatory error values are negative error values.

3. The method of claim 1, wherein the compensatory error values are passed through a decay function before being added to the contone data describing the successive slice, the decay function describing a diminishing effect of an error over a given distance through successive slices of a three-dimensional object being formed.

4. The method of claim 1, further comprising generating halftoning errors while generating halftone data for the slice.

5. The method of claim 1, wherein adding of the compensatory error value generated to contone data of a successive slice comprises adding the halftoning error values to the compensatory error values and adding the resultant error to the contone data of the successive slice.

6. The method of claim 1, wherein the adding the compensatory error values generated to contone data of a successive slice comprises adding all of the compensatory error values to corresponding voxel locations in the contone data of the successive slice.

7. The method of claim 1, wherein generation of the halftone data for the slice comprises using an error diffusion halftoner.

8. The method of claim 1, further comprising using empirical data regarding the propagation of heat or fluid as a three-dimensional object is formed to generate the compensatory error values.

9. The method of claim 8, further comprising a look-up table comprising the empirical data.

10. The method of claim 1, wherein the compensatory error value is diffused to additional neighboring voxels of a corresponding voxel in the successive slice, where the corresponding voxel is at the same location in the successive slice as a voxel from which the compensatory error value was generated in a preceding slice.

11. An additive manufacturing device comprising:
    a processor;
    an error diffusion module; and
    a halftoning module;
    wherein the processor:
    with the halftoning module, generates halftone data for a slice among a number of slices of three-dimensional contone model data;
    with the error diffusion module, generates compensatory error values based on the generated halftone data; and
    adds the generated compensatory error values to contone data for a successive slice;
    wherein the compensatory error values compensate for heat or fluid bleeding between adjacent layers of a three-dimensional object being formed from the contone model data.

12. The additive manufacturing system of claim 11, wherein the compensatory error values are negative error values.

13. The additive manufacturing system of claim 11, wherein the compensatory error values are passed through a decay function before being added to the contone data describing the successive slice.

14. The additive manufacturing system of claim 11, further comprising, with the halftoning module, generating halftoning errors while generating halftone data for the slice.

15. The additive manufacturing system of claim 11, wherein the adding the compensatory error value generated to contone data of a successive slice comprises adding the halftoning error values to the compensatory error values and adding the resultant error to the contone data of the successive slice.

16. The additive manufacturing system of claim 11, wherein generation of the halftone data for the slice comprises using an error diffusion halftoner.

17. A method comprising:
    generating halftone data for a slice among a number of slices of a three-dimensional contone model data, the generation of the halftone data generating halftone error values;
    generating compensatory error values based on the generated halftone data;
    adding a portion of the halftoning error values to the compensatory error values to get augmented error values; and
    adding the augmented error values to contone data for a successive slice;
    wherein the compensatory error values compensate for heat or fluid bleeding between adjacent layers of a three-dimensional object being formed from the contone model data.

18. The method of claim 17, wherein the compensatory error values are negative error values.

* * * * *